United States Patent [19]
Heilmann

[11] Patent Number: 5,290,009
[45] Date of Patent: Mar. 1, 1994

[54] SELF-VENTING, RAPID CONNECTION-RELEASE COUPLING FOR COMPRESSED GAS LINES, FOR EXAMPLE COMPRESSED AIR LINES

[75] Inventor: Roland Heilmann, Wiernsheim, Fed. Rep. of Germany

[73] Assignee: RECTUS-Apparatebau, Walker Klein GmbH, Eberdingen-Nussdorf, Fed. Rep. of Germany

[21] Appl. No.: 956,607

[22] Filed: Oct. 5, 1992

[30] Foreign Application Priority Data
Oct. 8, 1991 [EP] European Pat. Off. ........ 91117101.5

[51] Int. Cl.⁵ .............................................. F16L 37/28
[52] U.S. Cl. .................................. 251/149.6; 285/316
[58] Field of Search ................ 251/149.6, 149.9, 149; 137/614.04, 614.05; 285/305, 315, 316

[56] References Cited
U.S. PATENT DOCUMENTS 4,060,219 11/1977 Crawford ........................ 251/149.6
4,366,945 1/1983 Bläuenstein ..................... 251/149.6
4,924,909 5/1990 Wilcox ............................ 137/614.05

FOREIGN PATENT DOCUMENTS
0100090 2/1984 European Pat. Off. .

*Primary Examiner*—Martin P. Schwadron
*Assistant Examiner*—Kevin L. Lee
*Attorney, Agent, or Firm*—Frishauf, Holtz, Goodman & Woodward

[57] ABSTRACT

A self-venting rapid connection-release coupling for pressurized gas lines, and in particular compressed air lines, has a coupling socket (1) and a coupling plug (2). The coupling socket is provided with two locking devices (22, 23) for the coupling plug (2), and these devices can be released in succession by a motion, in the same direction, of a slider sleeve (30) on the coupling socket (1). Moving the slider sleeve from a start or coupled position to an intermediate position, a first locking device (22) is released, but the slider sleeve (30) is arrested by a locking element (47), and the plug is held by the second locking device (23). The lockig element (47) is controlled as a function of the gas pressure in the coupling plug (2), until the gas pressure in the coupling plug (2) and the line to the severed compressed air line has been reduced by venting through venting conduits (51, 53). Only after the pressure has been released and vented, can the slider sleeve (30) be moved to a position permitting release of the coupling plug (2) from the socket (1).

12 Claims, 5 Drawing Sheets

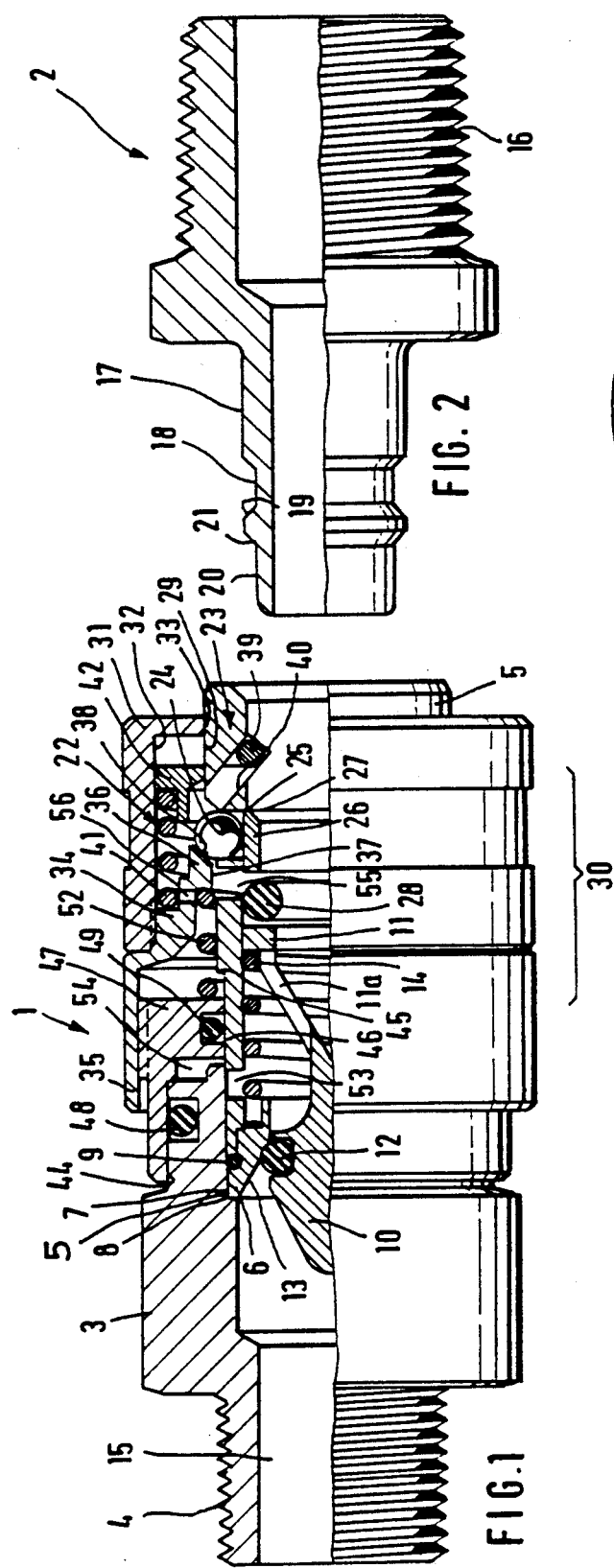

SELF-VENTING, RAPID CONNECTION-RELEASE COUPLING FOR COMPRESSED GAS LINES, FOR EXAMPLE COMPRESSED AIR LINES

Reference to related publications:
U.S. Pat. No. 4,366,945, Blauenstein, to which European 0 013 393 B1 corresponds
German Patent Specifications
19 02 986
19 43 552
22 26 793
27 05 319

FIELD OF THE INVENTION

The present invention relates to a self-venting rapid coupling system for rapid connection and release of compressed gas lines, and more particularly to such an arrangement in which, before uncoupling the coupling arrangement, the coupled line is vented to prevent uncontrolled, and possibly hazardous movement of the line as the coupling is released to disconnect the now uncoupled line from the compressed gas, for example, compressed air source.

BACKGROUND

It is known to provide a coupling socket, which can be connected to a first line and receives a coupling plug of a second line in sealed fashion; a closing valve located in the coupling socket is intended to be kept open by the inserted coupling plug. Locking devices are located on the coupling socket, each having at least one locking element for the inserted coupling plug. A slider sleeve, supported axially displaceably on the coupling socket counter to spring force and cooperating with the two locking devices, is provided; it is manually actuatable and can be displaced counter to spring force, from an outset position in which the coupling plug is kept in its coupling position by a first locking device, when the valve is open, to a first position in which the coupling plug is kept in an intermediate position by the second locking device, when the valve is closed. A venting device is operative for the second line. The slider sleeve can then be displaced from this first position in the same direction onward to a second position, in which the coupling plug is completely released.

Various versions of rapid connection-release coupling with these characteristics are known, for instance from German Patent Specifications 19 02 986, 19 43 552, 22 26 793, and 27 05 319. The essential property of this self-venting coupling is that provisions are made to counteract the danger to the user upon uncoupling, caused by the fact that when the coupling is loosened, the pressurized gas in the uncoupled line is released and escapes through the coupling plug. Even with relatively small cross sections and lengths of the uncoupled line, uncoupling causes a sudden whiplike motion of the line that endangers the user. The danger of injury to the user is all the greater unless unintentional uncoupling of the line is reliably precluded.

The known rapid connection-release coupling is therefore designed in such a way that for uncoupling, the user should first advance the slider sleeve to a first position, in which only the first locking device that has held the coupling plug in its sealed coupling position is release. The coupling plug can enter an intermediate position in the coupling socket by traveling only a relatively short distance, which is longer than the stroke of the valve, and is securely locked in this intermediate position by the second locking device. In this intermediate position, with the valve closed, the coupling plug communicates with the ambient air via a venting device in the form of conduits or annular gaps in the coupling socket, so that venting of the line connected to it can proceed as long as the coupling plug is still firmly held in the coupling socket. Only once the venting has been done should the user displace the slider sleeve from the intermediate position to a final position, in the same direction as in the previous motion from the outset position to the intermediate position; in the final position, the second locking device is also released, so that the coupling plug is completely released. Variably dimensioning the spring characteristics of spring means intended for biasing the slider sleeve toward its outset position, for instance, provides a locking threshold for the slider sleeve, so that increased displacement force is required from the user if he wishes to shift the slider sleeve out of the intermediate position into the final position. The user can arbitrarily overcome this locking threshold and thus in a single gesture shift the slider sleeve from its outset position to the final position, or from the intermediate position to the final position, before venting has been completed; hence with this rapid connection-release coupling, the release of the coupling plug before the line connected to it has been sufficiently well vented cannot be precluded, with the attendant danger to the surroundings from the released coupling plug and the whipping line. Moreover, the user can essentially perceive the completion of the venting process only acoustically, from the cessation of the noise produced by the gas as it emerges under pressure.

The same is basically true of a pipe coupling known from European Patent Specification 0 013 393 B1, to which U.S. Pat. No. 4,366,945, Blauenstein, corresponds, in which the arrangement is such that for uncoupling, the slider sleeve is first pushed back from its outset position into a first position, in which the coupling plug can move to an intermediate position for venting, from which the coupling plug is then released by moving the slider sleeve, held in its intermediate position by resilient detent means, back in the opposite direction into its outset position. Once again, by an arbitrary rapid displacement of the slider sleeve back and forth, the user can release the coupling plug from the coupling socket immediately, independently of the venting process. Particularly with overhead work, the coupling plug might unintentionally be spun out of the coupling socket if the slider sleeve is unintentionally shifted back and forth.

THE INVENTION

It is an object to provide a self-venting, readily releasable coupling arrangement for pressurized gas lines, typically compressed air lines, which permits safe release of the coupling and which, further, can be simple to operate, has a high degree of reliability and safety with respect to undesired release of the coupling plug if the compressed air line is not yet vented; and which, further, can be readily made and which does not result in a constriction of the cross-sectional area available for gas passage through the coupling, nor substantially extends the outer diameter of the coupling line beyond small-size couplings available without the advantages of the coupling unit of the present invention.

Briefly, the coupling socket has a movable locking element secured thereto. It forms an axial abutment for a slider sleeve, which controls coupling and uncoupling of a plug within the socket. In the fully engaged or start position, the coupling plug opens plug holds open a closing valve located within the coupling socket. To sever the coupling, the sleeve is moved first to an intermediate position. The gas pressure within the unit holds the locking element in a first position, where it forms an abutment for the slider sleeve. Upon movement of the slider sleeve to the intermediate position, the slider sleeve closes a supply line valve and a vent is opened. Opening the vent releases the pneumatic pressure on the locking element and vents the plug, which then permits the user to move the slider sleeve to a final release position where the plug can be pulled out.

The arrangement by which the locking element is controlled by pressure available before the plug can be released has the advantage that the slider sleeve can be pushed back only to the point where the valve closes and the vent opens, without, however, yet permitting complete removal of the connecting plug. Only after the line to be uncoupled has been vented, which may take from 2 to 4 seconds, depending on the pressure, the volume of the line to be uncoupled, and the like, is it possible to move the slider sleeve sufficiently far back in order to release the coupling plug.

This accordingly precludes not only improper operation of the rapid connection-release coupling during the uncoupling process, but also any attempt to force the rapid connection-release coupling open before venting has been completed. At the same time, the advantage of single-handed operation or in other words simple manipulation is preserved in this rapid coupling. To effect coupling, the user need not hold or actuate the slider sleeve.

In a preferred embodiment, the locking element is an annular plunger, supported axially displaceably on part of the coupling sleeve: the plunger defines a cylindrical chamber, which has a pressure impingement connection controlled by the sliding valve. This pressure impingement connection can in turn have at least one conduit, leading inward and discharging within the coupling socket on the side downstream of the closing valve seat.

Depending on the pressure applied on or supplied to the locking element, it will be either is in the stop position, in which it arrests the slider sleeve in its intermediate position, or assumes a position of repose, in which it releases the slider sleeve, so that the slider sleeve can be transferred to its final position; as a result, the locking element can at the same time be used as a visual indicator of the instantaneous condition of the coupling and of the progress of the venting. To that end, the locking element may have a part that can be seen from the outside and that by its position acts as an indicator for the pressure application of the locking element. This means that the user of the novel rapid coupling no longer has to rely on auditory perception of the noise of the outflowing gas in the uncoupling process; instead, directly from the rapid coupling itself, the user can read off whether the venting has already progressed far enough that he can push the slider sleeve back into its final position and release the plug without risk.

DRAWINGS

FIGS. 1 and 2, in a side view partly in axial section, show the unconnected coupling, namely, FIG. 1, the coupling bushing or socket and FIG. 2, the coupling plug of an uncoupled, self-venting rapid connection-release coupling according to the invention;

FIG. 3, in an end-on plan view, shows the coupling socket of FIG. 1;

FIG. 4, in a plan view, shows a detail of the annular plunger and of the slider sleeve of the coupling socket of FIG. 1;

FIG. 5, in a side view, partially in axial section, shows the rapid coupling of FIGS. 1, 2 in the coupled state;

FIG. 6, in a corresponding view, shows the rapid coupling of FIG. 5, which the coupling plug in the intermediate position and showing the condition prior to conclusion of the venting;

FIG. 7, in a view corresponding to FIG. 6, shows the rapid coupling of FIG. 6, showing the state upon conclusion of the venting; and FIG. 8, in a view corresponding to FIG. 5, shows the rapid coupling of FIG. 5, showing the state upon release of the second locking device.

DETAILED DESCRIPTION

The self-venting rapid connection-release safety coupling comprises a coupling socket 1 and a coupling plug 2, associated with it, which can be inserted in sealed fashion into the coupling socket 1.

Figure 5:
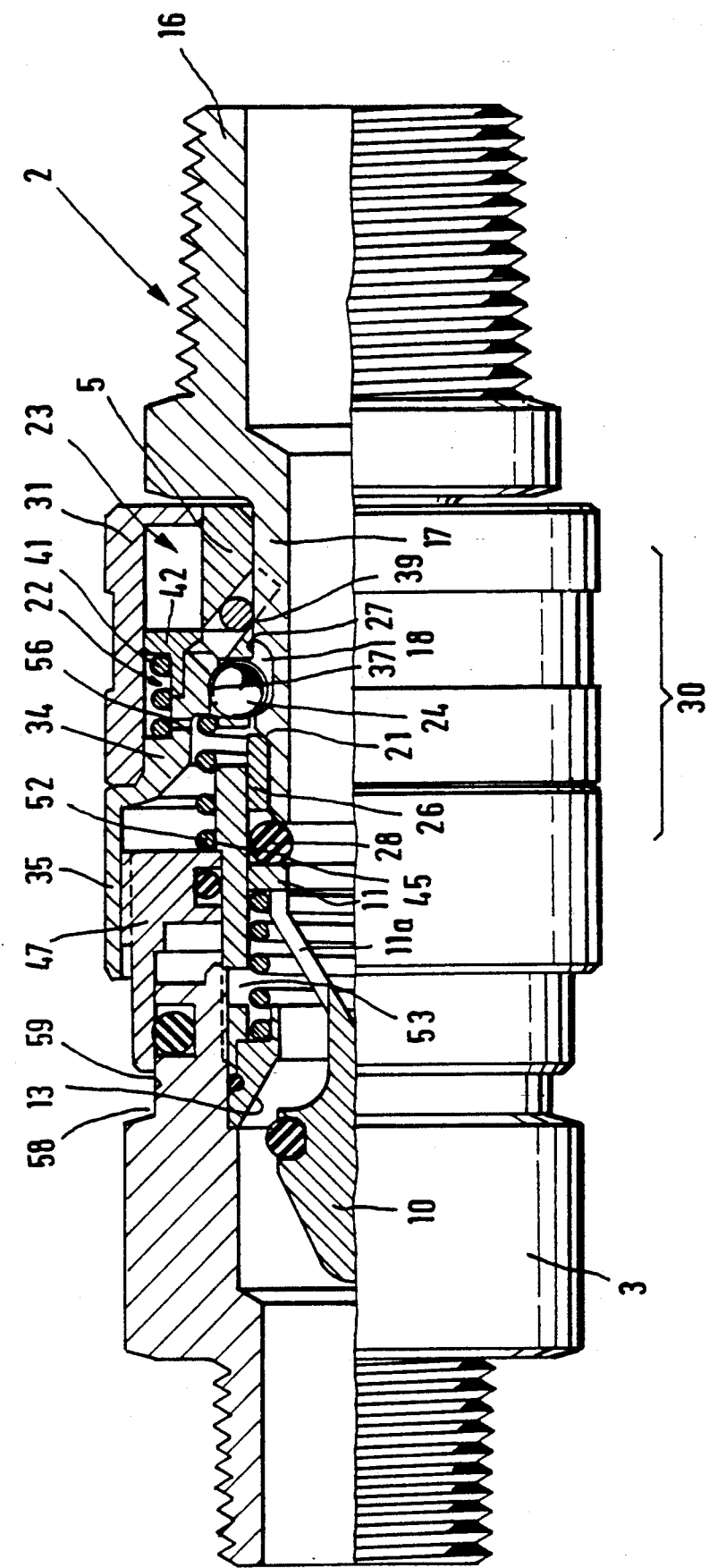

The coupling socket 1 has a substantially hollow-cylindrical socket part 3, onto which a threaded element 4 is formed on one end, serving to provide a connection with a first pressurized gas line, not otherwise shown, such as a compressed air hose. On the other end, a valve body 5, also substantially hollow-cylindrical, is screwed into the socket part 3 and fixes a valve seat ring 6, which is inserted into a turned recess 7 of the socket part 3 and is axially supported against an annular shoulder 8. An intervening 0-ring 9 serves to provide gas-tight sealing. A valve closing element 10 is displaceably guided in the valve body 5 by means of an annular flange 11 which carries an 0-ring 12 that cooperates with a conical valve seat 13, formed on the valve seat ring 6, and together with it forms a closing valve. The closing element 10 is biased toward the closing position shown in FIGS. 1 and 8 by a compression spring 14 located between the annular flange 11 and the valve seat ring 6; in this closing position, the coaxial gas passage conduit 15 of the coupling socket 1 is closed off to prevent any escape of gas. The annular flange 11 is joined to the closure element 10 only via ribs 11a distributed annularly around it, between which a free passageway cross section for the gas flow exists when the closing valve is open (FIG. 5).

The coupling plug 2, provided with a threaded portion 16 for connection to a second line, such as a compressed air hose likewise not shown in further detail, has a substantially hollow cylindrical plug part 17 that can be inserted with radial play into the valve body 5. An encompassing circumferential groove 18 is located on the outside of the plug part 17 in this region and is provided with a conical face 19, at least on the end adjacent the free end of the plug part 17. Finally, the plug part 17, toward its end, has a cylindrical region 20 of reduced diameter, defined on the inside by an annular shoulder 21.

The coupling socket 1 is provided with two locking devices 22 and 23, which are axially offset from one another. The first locking device 22 is formed as a ball lock. As its locking elements, it has a number of balls 24 (six, in the present case), radially movably supported in corresponding through bores 25 of the valve body 5 that form a kind of ball cage. A spacer sleeve 26, guided for easy displacment in the valve body 5, can be displaced between one position, shown in FIGS. 1 and 8 and defined by an annular shoulder 27 of the valve body 5, in which it blocks the bores 25 of the ball cage containing the balls 24 toward the inside, and a position to the side, which can be seen in FIG. 5, for instance, in which it has uncovered the bores 25, so that the balls 24 can drop into place in the circumferential groove 18 of the inserted plug part 17. An O-ring 28 is inserted between the spacer sleeve 26 and the annular flange 11 of the valve closure element 10 without radial biasing; when the coupling plug 2 is fully inserted, this O-ring serves as seen in FIG. 5 to seal off the plug part 17 from the valve body 5, and when the coupling plug 2 is inserted, the valve closure element 10 is held in the open position via this O-ring.

A slider sleeve 30 acting as an unlocking sleeve for the two locking devices 22, 23 is axially displaceably guided on a cylindrical circumferential face 29 of the valve body 5. The slider sleeve 30 is formed in two parts. It comprises a first caplike sleeve part 31, which is provided with a cylindrical bore 32 and has a guide face 33, and a coaxial second sleeve part 34, which is screwed into the first sleeve part 31 and is provided with a cylindrical apron-like part 35 on its end. A ring 36 located inside the first sleeve part 31 is formed onto the second sleeve part 34; it has a cylindrical smooth inside face 37 and a substantially conical end face 38.

As can be seen from FIG. 5, for instance, the ring 36 is dimensioned and located in such a way that when the balls 24 have dropped into the circumferential groove 18 of the inserted coupling plug 2, the ring 36 engages the balls 24 with its inside face 37 and keeps them in their locking position, so that the coupling plug 2 is securely locked in the coupling socket 1 in the coupling position.

Figure 6:
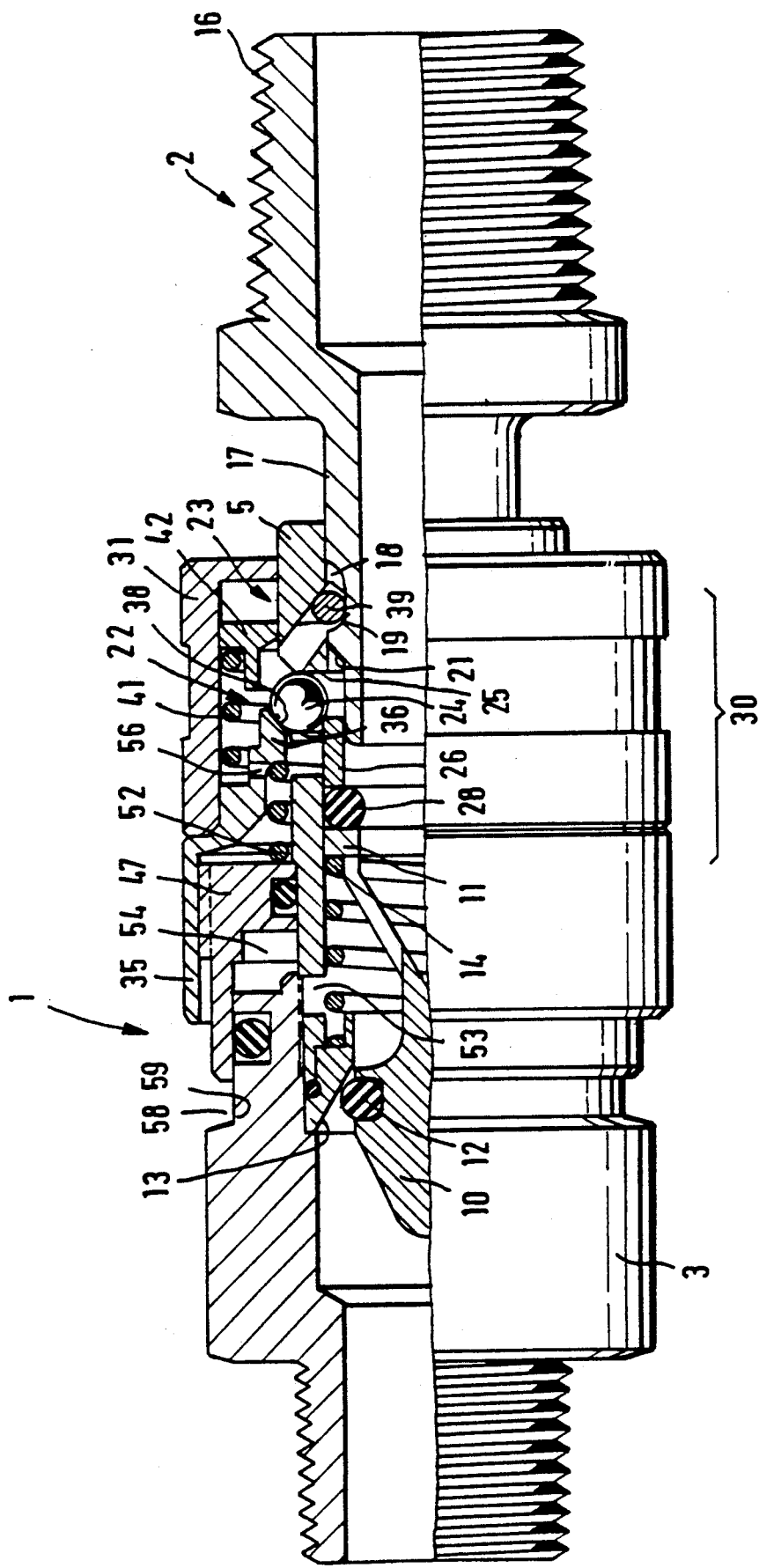

The second locking device 23 has two cylindrical retaining or locking pins 39, which are movable parallel to one another in two facing oblique guides 40 of the valve body 5, between an inoperative position shown in FIG. 5 and a locking position shown in FIG. 6, in which they have locked into place in the circumferential groove 18 of the plug part 17. These two positions of the locking pins 39 are shown in FIG. 3.

In the direction of their locking position (FIGS. 6, 7), the locking pins 39 are biased by a compression spring 41, which is located in the slider sleeve 30 and is supported on one end on the second sleeve part 3. On its other end, the compression spring 41 rests on a pressure plate 42, which is guided along the wall of the cylindrical bore 32 of the slider sleeve 30 and along the guide face 29 of the valve body 5, and on which the ends of the locking pins 39 rest.

An annular plunger 47 forming a locking element is guided longitudinally displaceably on a cylindrical face 44 of the socket part 3 and on a recessed cylindrical face region 46 of the valve body 5 that forms an annular shoulder 45; the annular plunger 47 is sealed off from the socket part 3 by an O-ring 48 and from the valve body 5 by an O-ring 49. As can be seen from FIG. 4, the annular plunger 47 is provided on its cylindrical outer surface with flats 50 forming a kind of hexagon, which together with the inner cylindrical face of the apron-like part 35 of the second sleeve part 34 fitting over it define axial venting conduits 51, which are part of a venting means. A compression spring 52 located between the annular plunger 47 and the second sleeve part 34 is arranged to keep the slider sleeve 30 in the outset position shown in FIG. 5.

The self-venting rapid connection-release coupling described thus far functions as follows:

In the coupled state shown in FIG. 5, the coupling plug 2 is inserted by its cylindrical plug part 17 all the way, or in other words as far as possible, into the coupling socket 1. In this coupling position, the coupling plug 2 is locked in a fixed position by the balls 24 of the first locking device 22, which have dropped into place in its circumferential groove 18. The balls 24 are held form-fittingly in their locking position by the fact that they rest on the inside face 37, fitting over them, of the ring 36 of the slider sleeve 30. The slider sleeve 30 itself is in its outset position, advanced as far as possible to the right (FIG. 5), in which it is kept by the compression spring 52.

Via its plug part 17 in the O-ring 28, the inserted coupling plug keeps the valve closure element 10 in a position raised from the valve seat 13, so that the closing valve is opened as far as possible. A cylindrical chamber 54, defined by the socket part 3, valve body 5 and annular plunger 47, communicates with the gas passageway conduit 15 via radial pressure impingement conduits 53 located in the valve body 5, so that the annular plunger 47 is acted upon on its inside by the gas pressure. The annular plunger 47 is therefore in a stop position defined by the annular shoulder 45, in which it has been displaced as far as possible to the right, in terms of FIG. 5, toward the mouth of the coupling socket 30.

The locking pins 39 of the second locking device 23 rest on the plug part 17 in the region next to the circumferential groove 18. They are biased in the engagement direction by the compressed compression spring 41 via the pressure ring 42.

Finally, the spacer sleeve 26 has been displaced to the left by the annular shoulder 21 of the plug part 17; it is inoperative in this position.

OPERATION

For uncoupling, the user pushes the slider sleeve 30 to the left, beginning at the outset position of FIG. 5, to a first position which is shown in FIG. 6. In this motion of the slider sleeve 30 from the outset position of FIG. 5 to the first position of FIG. 6, the inside surface 37 of the ring 36 releases the balls 24 of the first locking device 22, so that they can be pressed radially outward into their bores 25 by the conical face 19 of the retracting coupling plug 2. Upon its outwardly oriented axial motion, the coupling plug 2 also releases the valve closure element 10, so that its compression spring 14 can move to the right, in terms of FIG. 5, until the O-ring 12 meets the valve seat 13, thus closing the closing valve. In the process, in its motion toward the closing position, the valve closure element 10 carries the spacer sleeve 26 along with it via the annular flange 11 and the O-ring 28; the spacer sleeve is accordingly displaced to the position shown in FIGS. 7, 8, in which it closes the bores 25 and radially supports the balls 24.

Figure 7:
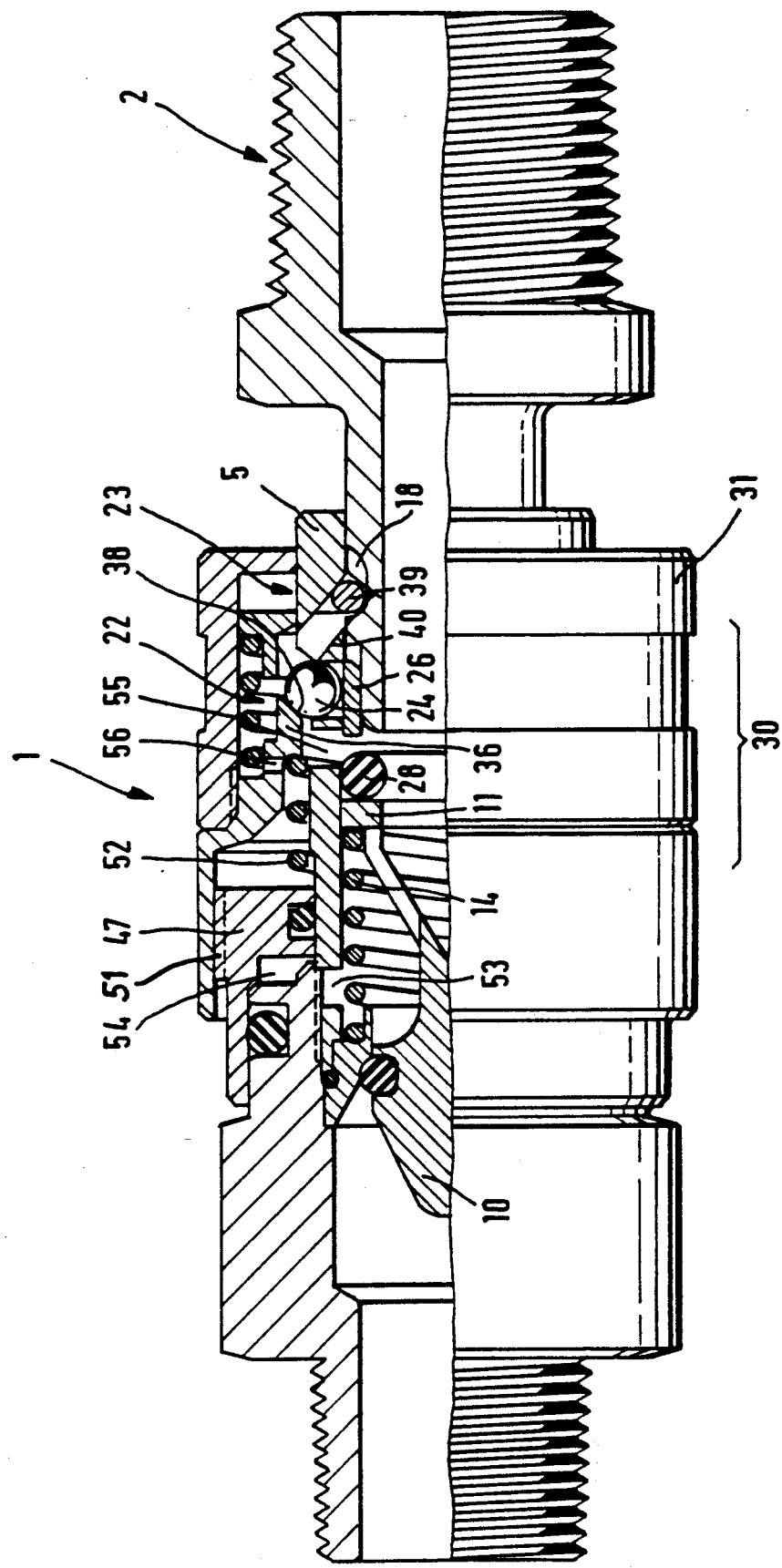

Shortly after the balls 24 have emerged from the circumferential groove 18 of the coupling plug 2 in the manner described, the circumferential groove 18 reaches the region of the spring-loaded locking pins 39 of the second locking device 23, which drop into the circumferential groove 18 under the influence of their spring biasing. The coupling plug 2 is thereby locked in an intermediate position by the second locking device 23, as shown in FIG. 7.

In this intermediate position, the coupling plug 2 is held captive in the coupling socket 1 by the second locking device 23. The user can now let go of the slider sleeve 30, which having reached its first position (FIG. 7) is locked counter to the action of the compression spring 52, because it is supported by its conical face 38 against the balls 24, which in turn rest radially on the spacer sleeve 26 and can therefore not escape.

With the coupling plug 2 in this intermediate position, the line connected to it is vented via the coupling plug 2, through conduits 55 provided in the valve body 5, and the venting conduits 51 between the annular plunger 47 and the apronlike part 35 of the slider sleeve 30. At the same time, however, via conduits 56 provided in the second sleeve part 34, the pressure plate 42 is also effectively acted upon by pneumatic pressure additional to the force of compression spring 41, and acting in the same direction as the compression spring 41. This also provides for application of additional force applied to the locking pins 39 in the critical phase after release or unlocking of the first locking device 22, and as the second locking device 23 becomes operative. The locking pins 39 of the second device 23 are subjected to this additional force, which is effective to rapidly and securely engage the locking pins 39 into the circumferential groove 18 of the coupling plug 2 as the plug moves outwardly.

In the first position shown in FIG. 6, the slider sleeve 30 is arrested in the other axial direction by the annular plunger 47, which forms a stop and is initially still retained in its stop position (FIG. 6) by the gas pressure prevailing in the interior of the coupling socket 1. As already noted, the closing valve is closed when the coupling plug 2 is in its intermediate position (FIG. 7), while the coupling plug and the line connected to it are vented; as a result, the pressure in the interior of the coupling socket 1 drops progressively on the end of the valve closure element 10 toward the coupling plug 2. Since the pressure the valve closure element 10 discharge on the inside, the pressure impingement of the annular plunger 47 lessens accordingly. As soon as the pressure impingement drops below a predetermined threshold value, the compression spring 52 can increasingly displace the annular plunger 47 to the left, in terms of FIG. 6, so that the plunger releases the slider sleeve 30.

The venting has now progressed far enough that the coupling plug 2 can be safely removed from the coupling socket 1. To that end, beginning at the intermediate position of FIG. 7, the user pushes the slider sleeve 30, released by the annular plunger 47, into its final position shown in FIG. 8. In this motion, the locking pins 39 of the second locking device 32 are guided rearward on the outside in compulsory fashion by the first sleeve part 31 of the slider sleeve 30 in the oblique guides 40, until they release the coupling plug 2 (FIG. 8), which can then be removed from the coupling socket 1.

If the user then lets go of the slider sleeve 30, it returns to its first position shown FIG. 7, under the influence of the compression spring 52; in this position, as already described, it is locked in a positionally fixed manner by the balls 24 of the first locking device 22. The locking pins 39 of the second locking device 23 have retracted in their oblique guides 40 far enough that they do not hinder reinsertion of the coupling plug 2 the next time coupling is attempted.

Figure 8:
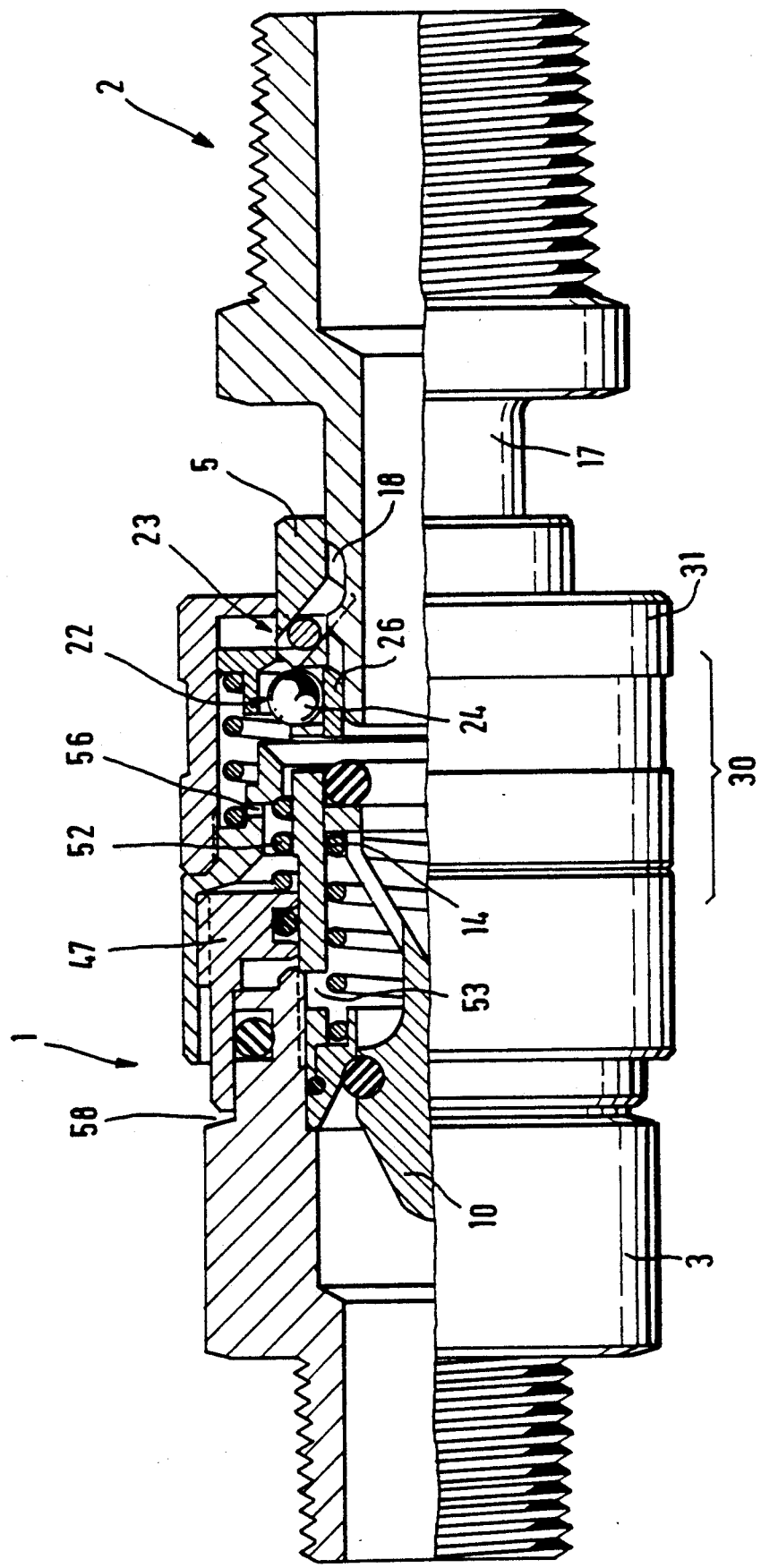

Since the annular plunger 47 is held in the stop position shown in FIGS. 5, 6 by the pressure in the interior of the coupling socket 1 and coupling plug 2 until this pressure, in the course of venting, has decreased far enough that the compression spring 52 can displace the annular plunger 47 back into the position of repose shown in FIG. 8, the annular plunger 47 can simultaneously be used as a visual indicator of the progress of venting while the coupling plug 2 is in the intermediate position. To this end, the socket part 3, on the bottom of a gap 58 defined between it and the end face of the apronlike part 35 of the slider valve 30, for instance, is provied with colored markings 59, which are covered increasingly as the internal pressure decreases. As long as they are visible, the coupling plug 2 cannot be safely removed from the coupling socket 1.

In coupling, the coupling plug 2 is inserted by its plug part 17 into the coupling socket 1, which is in the condition shown in FIG. 1. The slider sleeve is initially in its first, retracted, position, in which it is kept by the balls 24. The locking pins 39 are pressed elastically outward by the annular shoulder 21, which then meets the spacer shoulder 26, and as the inward motion of the plug part 17 continues, the spacer sleeve 26 is displaced to the left (FIG. 5), until the balls 24 are exposed. As a result, the compression spring 52, via the ring 36 and its conical face 38, can press the balls radially inward until they lock securely into place in the circumferential groove 18 of the plug part 17, which had beforehand—as already described above—displaced the valve closing body 10 in the opening direction of the closing valve. Once the balls 24 have locked into place, the slider sleeve 30 can be returned by the compression spring 52 to the outset position of FIG. 5, in which the balls 24 are form-fittingly retained in their locking position. The fact that the slider sleeve 30 has returned to its outset position indicates to the user that the first locking device 22 has securely fixed the coupling plug 2. The rapid connection-release coupling thus has an additional visual safety indication of the locking condition of the coupling plug.

Instead of the locking pins 39, the second locking device 23 could also be provided with locking elements in the form of balls, as known per se.

The first locking device 22 that keeps the coupling plug 2 in its coupling position is advantageously a ball lock, having at least one ball 24 guided radially movably in a cage 25 of the coupling socket 1; when the sliding sleeve 30 is in its position of repose, the ball 24 is held by a face on the slider sleeve 30 in an engagement position with a groove 18 of the coupling plug 2, and is released by the slider sleeve 30 in the intermediate position of that sleeve. This ball lock makes it possible to use a relatively large number of balls (such as six) for retaining the coupling plug 2 in the coupling position, in which the coupling plug is pressed in biased fashion against the associated seal in the coupling socket 1 and against the closing spring of the closing valve. Because this axial biasing force is distributed over a corresponding plurality of support points on the wall of the circumferential groove 18 of the coupling plug 2, the pressure per unit of surface area at the various support points is correspondingly low, so that even coupling plugs of soft material (such as brass) can be used without the danger of premature wear.

It is also proved to be practical for the slider sleeve 30 to be locked in its first position by one of the two locking devices counter to spring force; its locking by the coupling plug 2 can be released upon insertion into the coupling socket 1. In this way, it is possible upon insertion of the coupling plug 2, or in other words upon coupling, to provide a practical visual display of proper locking of the coupling plug in its coupling position. To that end, in the embodiment having the aforementioned ball lock, the slider sleeve can be locked in its intermediate position by the at least one ball 24. Accordingly, the slider sleeve 30 is not released, allowing it to move over the ball and reach its outset position, until the first locking device has locked properly into place. If for any reason the slider sleeve 30 should not have reached its outset position, this indicates that the coupling plug 2 has not been coupled properly. This is in contrast to known versions of rapid connection-release couplings, in which the slider sleeve remains unmoved upon coupling, with the result that coupling of the coupling plug can be perceived only acoustically, from the noise produced as the locking elements of the first locking device lock into place.

The second locking device 23 that keeps the coupling plug 2 in its intermediate position can have any suitable design, including that of another ball lock. However, it has proved especially advantageous if this locking device 23 has at least one locking element movably guided in an oblique guide 40 of the coupling socket 1 and supported by spring means against the slider valve 30. The locking element may be a locking pin 39, although versions with a ball are also conceivable. One such locking device is known in principle from German Patent Specification 19 02 986. However, the support of the locking elements there by the spring means is against the coupling socket, rather than against the slider sleeve.

The aforementioned at least one locking element of the second locking device 23 may be supported counter to the spring means via a pressure pad movably supported in the slider sleeve; when the coupling plug 2 is in the intermediate position, the pressure pad is acted upon intermittently by pressure in a direction that reinforces the spring means, via conduits of the venting means formed in the slider sleeve 30. This makes an additional outlet cross section available for the quantity of gas flowing out in the venting process, thereby shortening the venting process itself, and secondly, during the critical phase of motion of the coupling plug 2 out of its coupling position into the intermediate position, the at least one locking element of the second locking device 23 is additionally biased toward its locking position and therefore drops with increased certainty into the circumferential groove 18 of the coupling plug 2.

Finally, the slider sleeve 30 may be designed to fit at least partially over the aforementioned annular plunger 47, with venting conduits of the venting means leading to the outside between the annular plunger 47 and the slider sleeve 30. This protects the mouth of the venting conduits and puts it at a favorable position.

Various changes and modifications may be made, and features described in connection with any one of the embodiments may be used with any of the others, within the scope of the inventive concept.

I claim:
1. Self-venting rapid coupling for compressed gas lines having
   a coupling plug (2), adapted for connection to a first gas line;
   a coupling socket (1) receiving said coupling plug (2), and adapted for connection to a second gas line subject to pneumatic pressure;
   a valve (10) located in the coupling socket (1) engageable by the coupling plug, said coupling plug holding the valve in OPEN condition when the coupling plug is inserted in the coupling socket;
   a first locking device (22) having at least oe first locking element (24) secured to the coupling socket to lock the plug to the socket, when inserted therein;
   a second locking device (23) having at least one second locking element (39) secured to the coupling socket for locking the plug to the socket;
   a slider sleeve (30) located on the coupling socket (1) and axially slidable thereon;
   spring bias means (14) acting on the slider sleeve (30),
   the slider sleeve (30) being operatively coupled to the first and second locking devices (22, 23) and movable counter to the spring force of the spring bias means (14) from
   a) a start position, in which the coupling plug (2) is retained by the first locking device (22) in locked position in the coupling socket (1) with the valve (10) in open condition, to
   b) an intermediate position, wherein
   the coupling plug (2) is retained by the second locking device (23) in locked position while still at least partly inserted in the socket (1), and
   in which the valve (10) is in closed condition,
   the first locking means (22) and the first locking element (24) are released from locked position; and to
   c) a second or released position in which the coupling plug (2) can be removed from the coupling socket (1),
   comprising, in accordance with the invention,
   a venting means (51, 55, 56);
   a movable further locking element (47) located on the coupling socket (1) and forming an axial abutment for the slider sleeve (30) when the slider sleeve (30) is in the intermediate position,
   said movable further locking element (47) being subject to pneumatic pressure in the first line coupled to said coupling plug (2) when the valve is open, said movable further locking element (47) being retained in abutting condition with respect to the slider sleeve (30) to arrest the sliding movement of the slider sleeve (30);
   and wherein, upon closing of the valve (10), said movable further locking element (47) is released from pneumatic pressure, the second line is vented through said venting means (51, 55) and the movable further locking element (47) moved to release position to permit movement of the slider sleeve (30) to the second or plug release position.

2. The rapid coupling of claim 1, wherein the movable further locking element (47) is an annular plunger (47), axially displaceably supported on a part (3) of the coupling socket (1), which annular plunger defines a cylindrical chamber (54) that has a pneumatic pressure application or supply connection (53) controlled by the closing valve (10).

3. The rapid coupling of claim 2, wherein the pressure application or supply connection has at least one conduit (53) leading inward, which discharges inside the coupling socket (1) on the end located downstream of the valve seat of the closing valve (10).

4. The rapid coupling of claim 3, wherein the slider sleeve (30) is formed to fit at least partly over the annular plunger (47);
   the further locking element (47) comprises an annular plunger; and
   the venting means comprise venting conduits (51) formed between the annular plunger (47) and the slider sleeve (30), leading outwardly of the coupling socket (1).

5. The rapid coupling of claim 2, wherein the movable further locking element (47) has or controls an indicator part (59) that is visible from outside to provide an indicator means for indicating the pressure application or supply on the further, movable locking element (47).

6. The rapid coupling of claim 1, wherein the first locking device (22) is a ball lock, having at least one ball (24) forming said first locking element, said at least one ball being guided radially movable in a cage (25) of the coupling socket (1), which ball, when the slider sleeve (30) is in the start position, is held by a surface (37) on the slider sleeve (30) in an engagement position with a groove (18) of the coupling plug (2) and is released by the slider sleeve (30) when the slider sleeve (30) is in its intermediate position.

7. The rapid coupling of claim 1, wherein the slider sleeve (30) is loced in its intermediate position counter the spring force of said spring (14) by one of the two locking devices (22, 23) and wherein said locking in the intermediate position position is releasable by the coupling plug (2) upon insertion into the coupling socket (1).

8. The rapid coupling of claim 6, wherein the slider sleeve (30) is locked in its intermediate position by the at least one ball (24).

9. The rapid coupling of claim 1, wherein the coupling socket (1) is formed, inwardly of the socket, with an oblique guide (40);
the second locking element (39) of the second locking device (23) is movably guided in the oblique guide (40) of the coupling socket (1) and is supported against the slider sleeve (30) by the spring means (41).

10. The rapid coupling of claim 9, wherein the second locking element comprises at least one locking pin (39).

11. The rapid coupling of claim 9, wherein the second locking element (39) is supported counter to the spring means (41) via a pressure pad (42) movably supported in the slider sleeve (30), so that when the coupling plug (2) is in its intermediate position, the pressure pad (42) is acted upon by pneumatic pressure in a direction that reinforces the spring means via conduits (56) of the venting means, formed in the slider sleeve.

12. The rapid coupling of claim 6, wherein the slider sleeve (30) is loced in its intermediate position counter to the spring force of said spring (14) by one of the two locking devices (22, 23) and wherein said locking in the intermediate position is releasable by the coupling plug (2) upon insertion into the coupling socket (1);
and wherein the slider sleeve (30) is locked in its intermediate position by at least one ball (24).

* * * * *

UNITED STATES PATENT AND TRADEMARK OFFICE
CERTIFICATE OF CORRECTION

PATENT NO. : 5,290,009
DATED : March 1, 1994
INVENTOR(S) : Heilmann, Roland It is certified that error appears in the above-identified patent and that said Letters Patent is hereby corrected as shown below:

On the title page, item (73): Assignee:
        "Walker" should be --Walter--.

Signed and Sealed this

Ninth Day of August, 1994

*Attest:*

BRUCE LEHMAN

*Attesting Officer*     *Commissioner of Patents and Trademarks*